350-271
SR
12-14-71 XR 3,626,769

APPARATUS FOR POSITIONING WORKPIECES IN SELECTED TRANSLATIONAL AND ROTATIONAL ORIENTATIONS

Filed April 6, 1970 2 Sheets-Sheet 1

INVENTORS
EDWARD P. HECKER
JOSEPH E. KULAK
BELA MUSITS
BY
J. B. Kraft
ATTORNEY

Dec. 14, 1971 E. P. HECKER ET AL 3,626,769

APPARATUS FOR POSITIONING WORKPIECES IN SELECTED TRANSLATIONAL AND ROTATIONAL ORIENTATIONS

Filed April 6, 1970 2 Sheets-Sheet 2

United States Patent Office 3,626,769
Patented Dec. 14, 1971

3,626,769

APPARATUS FOR POSITIONING WORKPIECES IN SELECTED TRANSLATIONAL AND ROTATIONAL ORIENTATIONS

Edward P. Hecker, Poughkeepsie, Joseph E. Kulak, Hopewell Junction, and Bela Musits, Wappingers Falls, N.Y., assignors to International Business Machines Corporation, Armonk, N.Y.

Filed Apr. 6, 1970, Ser. No. 26,007
Int. Cl. F16h 25/16
U.S. Cl. 74—54 21 Claims

ABSTRACT OF THE DISCLOSURE

Apparatus for positioning workpieces including three leaf spring members, two of which are in alignment, one end of each being mounted in a fixed position and the other or free ends being spaced from and facing each other. A third member substantially perpendicular to the other two aligned members is mounted on the free ends of both of said other members. Accordingly, the first two members are deflectable about fixed pivots while the third member is deflectable about a floating pivot formed by the free ends of the first two members. The apparatus also includes first and second means for applying linear forces respectively to said first and second members, which forces are substantially perpendicular to a first coordinate axis, and means for applying to said third member a linear force which is substantially perpendicular to a second coordinate axis. The resulting displacement of the third spring member is applied to the workpiece being oriented.

BACKGROUND OF THE INVENTION

(1) Field of the invention

The present invention relates to the positioning of workpieces in selected translational (XY) and rotational $\theta$ orientations with respect to a pair of coordinate axes.

(2) Description of the prior art

Apparatus for positioning of articles or workpieces in preselected X, Y and $\theta$ orientations have been extensively used in the prior art. Examples of such prior art apparatus are described in U.S. Pats. 3,038,369, 3,207,904, and 3,466,514. While such prior art apparatus has been successfully used in a great amount of fabrication and processing equipment, its implementation in the fabricaton of advanced high density microminiature semiconductor integrated circuits has encountered problems.

In the fabrication of semiconductor integrated circuits, a precise X, Y and $\theta$ positioning step is required in a great many of the processng stages. Such a positioning step is requred for photolithographic maskng used in virtually every diffusion and metallization stage as well as for mechanical operations such as sawing or dicing the semiconductor wafer into the integrated circuit chips. With the ever increasing diminuation of integrated circuit elements to produce high density circuits, permissible tolerances in alignment or positioning steps have been significantly decreased. Repeatable accuracy requirements in the order of between $10^{-5}$ and $10^{-6}$ or greater are becoming common in the integrated circuit fabrication art.

The consistent maintenance of such a high order of accuracy has presented problems to prior art X, Y and $\theta$ positioning apparatus. This problem appears to be in large part due to friction wear by mated moving surfaces during the operation of such apparatus. In virtually all existing equipment, there is a substantial quantity of such mated moving surfaces, including lead screw means, rails and followers, springs or shafts moving within retaining sleeves, and plane or table surfaces which slides against each other. Even a minimal amount of friction appears to result in sufficient wear between mated surfaces to degrade the accuracy of the positioning apparatus to beyond the required limits after use for only a few hours or less. This problem of wear is even more pronounced in certain integrated circuit fabrication steps, such as sawing or dicing, which contaminate the apparatus ambient with fine particles. Such particles greatly increase the rate of friction wear.

On the other hand, even in an atmosphere such as a "clean room" which has a low level of dust or other particles in the air, the problem of friction wear still remains significant. In fact, the apparatus presents another problem with respect to fabrication steps which must be conducted in a contaminant-free "clean room." The quantity of lubricants required by the mated moving surfaces in existing equipment appears to be sufficient to result in an undesirable level of contamination of the ambient with particles of the lubricant.

SUMMARY OF THE INVENTION

Accordingly, it is a primary object of the present invention to provide translational and rotational positioning apparatus which is capable of maintaining a consistent, high degree of accuracy over prolonged periods of use.

It is another object of the present invention to provide translational and rotational positioning apparatus in which friction wear has been minimized.

It is a further object to provide translational and rotational positioning apparatus in which mated moving surfaces have been reduced to a minimum.

It is still another object to provide translational and rotational positioning apparatus having the consistent high degree of accuracy required in the fabrication of high density semiconductor integrated ciruits.

It is still a further object to provide translational and rotational positioning apparatus capable of maintaining a consistent accuracy to within between $10^{-5}$ and $10^{-6}$ or better.

The present invention solves the problems of prior art by providing an X, Y and $\theta$ positioning apparatus in which friction wear is minimized through a combination of three resilient members, preferably spring members. Two of the members are mounted on and resiliently deflectable about fixed pivots, while the third resilient member is suspended from the free ends of the first two members and is, thereby, spaced from and the free of contact with any other substrate or surface in the apparatus. The free ends of the first two members form therebetween a third pivot about which the third member is resiliently deflectable.

In order to effect the X, Y and $\theta$ displacement involved in the positioning, the apparatus includes means for applying to each of at least two of said resilient members, and preferably to all three, a linear force to deflect the member about its pivot. Also, means are provided for applying the resultant displacement of the combination of resilient members to the workpiece being oriented to effect a corresponding displacement of the workpiece.

U.S. Pat. 3,466,514 discloses a method for effecting a combined X, Y and $\theta$ displacement through the application of only three rectilinear forces. The present invention provides apparatus for implementing said method, in which frictional wear due to mated moving surfaces is minimized. In the present apparatus, first and second rectilinear forces, preferably perpendicular to a first coordinate axis, are applied to said first and second resilient members and a third rectilinear force, preferably perpendicular to a second coordinate axis, is applied to said third or "free floating" member. The resultant displacement of the third member is applied to the workpiece being positioned preferably by supporting the workpiece on the third member.

The foregoing and other objects, features and advantages of the invention will be apparent from the following more particular description and preferred embodiments of the invention as illustrated in the accompanying drawings.

DESCRIPTION OF THE PREFERRED EMBODIMENT

Figure 1:
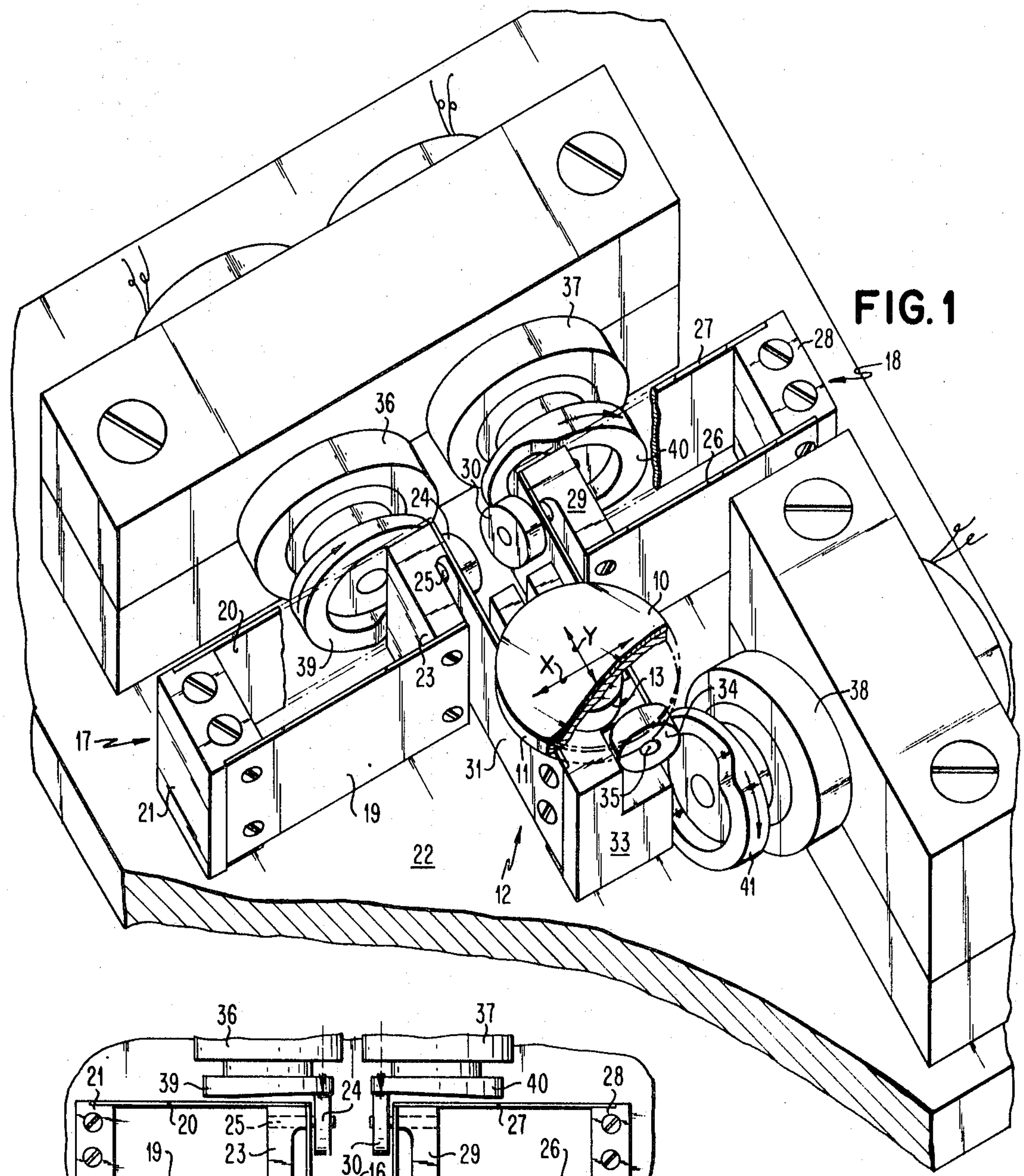
FIG. 1 is a fragmentary, perspective view of the preferred embodiment of the present invention.
Figure 2:
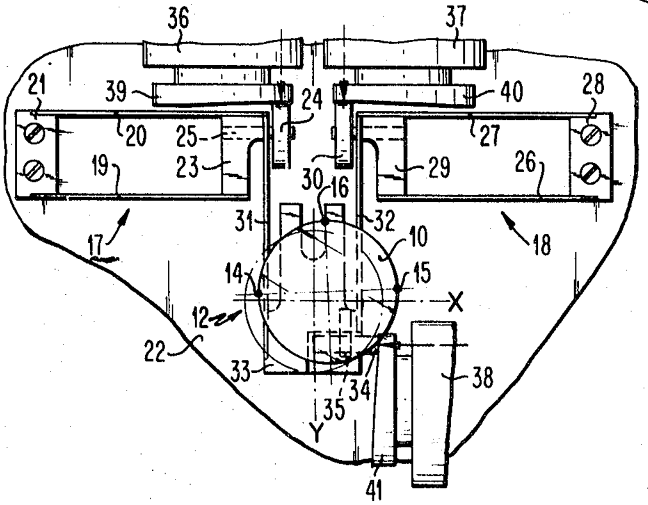
FIG. 2 is a simplified, fragmentary, plan view of the apparatus of FIG. 1 with the article to be positioned in its initial unoriented position.

With reference to FIGS. 1 and 2, wafer 10 seated on pedestal 11, which is affixed to "free floating" spring member 12 by shaft 13, is initially misoriented or out of the selected translational (X, Y) and rotational ($\theta$) orientation. The selected orientation is to be with respect to the X and Y coordinate axes shown in FIG. 2. The coordinate axes may be contained in the reticle of an optical device such as a microscope or on a video monitor if the device is being scanned by videcon means. In order to bring wafer 10 into the selected orientation required for a particular fabrication step, the wafer is to be translationally and rotationally moved so that markers 14 and 15 rest on the X coordinate axis and marker 16 rests on the Y coordinate axis.

In order to bring wafer 10 into the selected orientation, the combination of "free floating" spring member 12 and fixed pivot spring members 17 and 18 is moved in the manner to be hereinafter described. Spring member 17 comprises parallel leaf springs 19 and 20 mounted at one end on fixed pivot 21 which is supported on base 22. The springs are maintained in parallel relationship by spacer 23 at the free end of spring member 17. Cam follower 24 is mounted at the free end of spring member 17 through pin 25 in spacer 23. Through cam follower 24 a first linear displacement force will be applied to spring member 17 in the positioning of wafer 10. Spring member 18 is identical in structure to member 17 and comprises leaf springs 26 and 27, fixed pivot 28, spacer 29 and cam follower 30.

Free floating spring member 12 comprises parallel leaf springs 31 and 32 mounted respectively at the free ends of spring members 17 and 18. These free ends form therebetween a free pivot for spring member 12. Spacer 33 serves to maintain leaf springs 31 and 32 in parallel relationship and also acts as a support for shaft 13 which, in turn, supports wafer pedestal 11. Spacer 33 also supports cam follower 34 through pin 35.

The wafer is oriented through the application of three linear forces to the spring structure. Two of the forces are substantially perpendicular to the X axis and the other force is substantially perpendicular to the Y coordinate axis. The first two linear forces are respectively applied to spring members 17 and 18, while the third linear force is applied to free floating spring member 12. While the linear forces may be applied by any conventional means, we have found it preferable to apply them by means of first, second and third stepping motors 36, 37 and 38, which incrementally rotate inclined cams 39, 40 and 41 to respectively apply linear forces to spring members 17, 18 and 12 through cam followers 24, 30 and 34.

The input means to stepping motors 36, 37 and 38 are not shown. They may be manually operated by an operator who is viewing the wafer being positioned through a microscope or video monitor and inputting the necessary adjustments via the stepping motors to move the spring members for sufficient distances to bring markers 14 and 15 into alignment with the X axis and marker 16 into alignment with the Y axis. Alternatively, the stepping motors may comprise fluidic driving means such as servo motors operated in an automated system which automatically senses the respective deviations of the three markers from their axes and activates the servo motors over the distances necessary to bring the wafer into orientation. Such an automated system of the "open loop" type is described in U.S. Pat. 3,475,805, particularly FIGS. 4 and 5, as well as U.S. Pat. 3,466,514. Also, an automated "closed loop" sensing and servo motor adjusting system, such as that described in U.S. Pat. 3,207,904, should be adaptable to operate in combination with the orientation apparatus of the present invention.

Figure 2A:
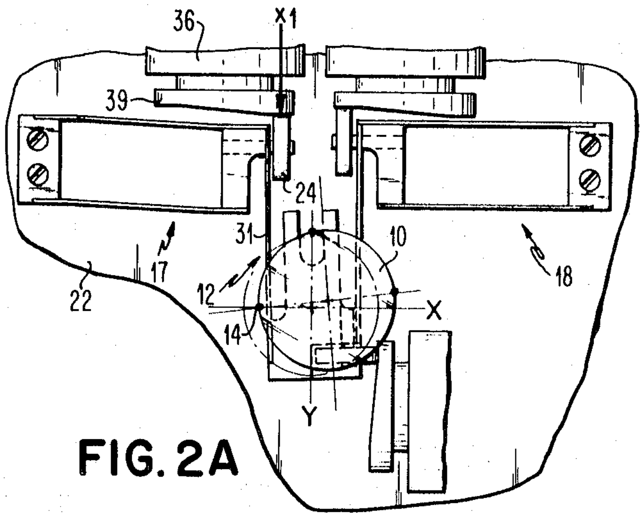
FIG. 2A is the same view as FIG. 2 after the first linear force means has been applied towards the orientation of the article.
Figure 2B:
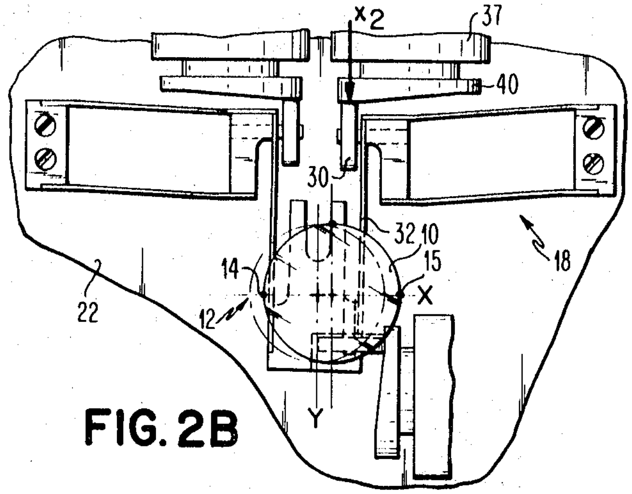
FIG. 2B is the same view as FIG. 2 after the first and second linear force means have been applied towards the orientation of the article.
Figure 2C:
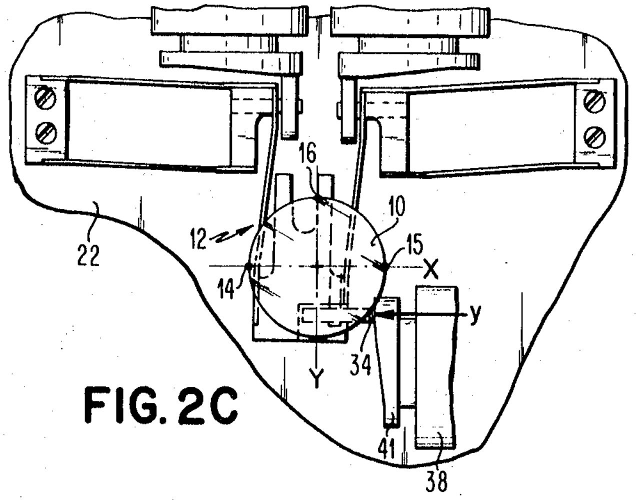
FIG. 2C is the same view as FIG. 2 after the first, second and third linear force means have been applied and the article is in its final selected orientation.

There will now be described, particularly with reference to FIGS. 2A, 2B and 2C, an operation wherein the misoriented wafer of FIG. 2 is brought into its selected orientation with respect to the X, Y axes. To aid in the understanding of the orientation mechanism, the operation will be shown as a sequence of movements starting with the first spring member 17 and ending with the third spring member 12. It should be understood, however, that the orientation operation may follow any sequence of movements between spring members 17, 18 and 12 as well as simultaneous movements of these members.

In the initial position, spring members 17, 18 and 12 are initially preloaded or tensed so that cam followers 24, 30 and 34 are respectively urged against cams 39, 40 and 41. This insures that "backlash" is maintained at a minimum. Stepping motor 36 rotates for a distance sufficient for inclined cam 39 to apply linear force $x_1$ against cam follower 24 to move the cam follower towards the X axis. This, in turn, deflects spring member 17 towards the X axis with a resulting deflection of leaf spring 31 of free floating spring member 12 towards the X axis, thereby bringing marker 14 into alignment with the X axis as shown in FIG. 2A.

Next, stepping motor 37 rotates for a distance sufficient for inclined cam 40 to apply linear force $x_2$ against cam follower 30 to move the cam follower towards the X axis. This, in turn, deflects spring member 18 towards the X axis with a resulting deflection of leaf spring 32 of free floating spring member 12 towards the X axis, thereby bringing marker 15 into alignment with the X axis as shown in FIG. 2B. Finally, stepping motor 38 rotates for a distance sufficient for inclined cam 41 to apply linear force $y$ against cam follower 34 to move the cam follower towards the Y axis. This, in turn, deflects spring member 12 towards the Y axis. The resulting deflection of leaf springs 31 and 32 of spring member 12 about its free floating pivot brings marker 16 into alignment with the Y axis. Accordingly, as shown in FIG. 2C, markers 14 and 15 are in alignment with the X axis and marker 16 is in alignment with the Y axis; the wafer is in its selected final orientation.

In the preferred embodiment, the applied rectilinear forces have been applied substantially perpendicular to the coordinate axes. However, it should be clear that where the structure and the layout of the apparatus do not readily permit the application of a force perpendicular to a particular axis, that force may be applied at another angle with respect to the axis. In such a case, the component of the applied force which is perpendicular to the axis will determine the extent of movement toward the axis.

While the application of all three forces are necessary for X, Y and $\theta$ orientation, where orientation having only two aspects, e.g., X, Y, is to be carried out, the application of only two linear forces should be sufficient to effect such an orientation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for orientation of a workpiece comprising first and second pivots;
   a first resilient member mounted on said first pivot at a point spaced from the free end of said member;
   a second resilient member mounted on said second pivot at a point spaced from the free end of said second member;
   said first and second members being resiliently deflectable about their respective pivots;
   said free ends of said first and second members being spaced from and facing each other;
   a third resilient member mounted on the free ends of said first and second members, said free ends forming therebetween a third pivot about which said third member is resiliently deflectable;
   at least first and second means for respectively applying to each of at least two of said resilient members a linear force to deflect said member about its pivot; and
   means for applying the resultant displacement of said resilient members to said workpiece to effect a corresponding displacement of said workpiece.

2. The apparatus of claim 1 including third means for applying to said third resilient member a linear force to deflect said third member about its pivot.

3. The apparatus of claim 2 wherein each of said resilient members comprises leaf spring means.

4. The apparatus of claim 1 wherein said third resilient member comprises a pair of connected leaf springs, each having one end respectively mounted on the free end of one of said first and second resilient members.

5. The apparatus of claim 4 wheerin said pair of leaf springs are parallel.

6. The apparatus of claim 1 wherein the means for applying the resultant displacement of said resilient members to the workpiece comprises means for applying the displacement of the third resilient member to the workpiece.

7. Apparatus for positioning a workpiece in a preselected translational and rotational orientation with respect to first and second coordinate axes comprising
   first and second pivots;
   a first resilient member mounted on said first pivot at a point spaced from the free end of said member;
   a second resilient member mounted on said second pivot at a point spaced from the free end of said second member;
   said first and second members being resiliently deflectable about their respective pivots;
   said free ends of said first and second members being spaced from and facing each other;
   a third resilient member mounted on the free ends of said first and second members, said free ends forming therebetween a third pivot about which said third member is resiliently deflectable;
   means for applying to said first resilient member a linear force in a direction perpendicular to said first coordinate axis to deflect said first member about its pivot;
   means for applying to said second member a linear force in a direction perpendicular to said first coordinate axis to deflect said second member about its pivot;
   means for applying to said third member a linear force in a direction perpendicular to said second coordinate axis to deflect said third member about its pivot; and
   means for applying the displacement of the third member, resulting from the application of at least two of said linear forces, to the workpiece to effect a corresponding displacement of the workpiece.

8. The apparatus of claim 7 wherein said third resilient member comprises a pair of connected leaf springs, each having one end respectively mounted on the free end of one of said first and second resilient members.

9. The apparatus of claim 8 wherein said pair of leaf springs are parallel.

10. The apparatus of claim 7 wherein each of said resilient members comprises leaf spring means and said linear forces are respectively applied to said leaf spring means.

11. Apparatus for translational and rotational orientation of a workpiece comprising
   a first leaf spring member, one end of which is mounted in a fixed position;
   a second leaf spring member, one end of which is mounted in a fixed position such that both members are in alignment and the free ends of said members are spaced from and face each other;
   a third leaf spring member, one end of which is mounted on the free ends of said first and second leaf spring members;
   means for applying a first linear force to said first leaf spring member in a direction perpendicular to a first coordinate axis;
   means for applying a second linear force to said second leaf spring member in a direction perpendicular to said first coordinate axis;
   means for applying a third linear force to said third leaf spring member in a direction perpendicular to a second coordinate axis, all of said linear forces acting in the same plane; and
   means for applying the displacement of the third leaf spring member, resulting from the application of at least two of said linear forces, to the workpiece to effect a corresponding displacement of the workpiece.

12. The apparatus of claim 11 wherein the third leaf spring member is substantially perpendicular to the aligned first and second leaf spring members.

13. The apparatus of claim 12 including means mounting said three linear force directing means whereby the three linear forces are each substantially perpendicular to the positions of the leaf spring to which the respective force is being applied prior to the displacement of said leaf springs.

14. The apparatus of claim 11 wherein said leaf spring members are each preloaded against its respective linear force applying means.

15. The apparatus of claim 11 wherein said third leaf spring member comprises a pair of parallel leaf springs, each having one end respectively mounted on the free end of one of said first and second leaf spring members.

16. Apparatus for positioning a workpiece in a preselected translational and rotational orientation with respect to first and second coordinate axes comprising
   a first pair of parallel leaf springs, one end of which is mounted in a fixed position;
   a second pair of parallel leaf springs, one end of which is mounted in a fixed position such that both of said pairs are in alignment and the free ends of said pairs are spaced from and face each other;
   a third pair of parallel leaf springs, one end of each leaf of which is respectively mounted on the free end of one of said first two pairs of springs;
   means for applying to said first spring pair a linear force in a direction perpendicular to said first coordinate axis to displace said leaf spring pair in said direction;
   means for applying to said second spring pair a linear force in a direction perpendicular to said first coordinate axis to displace said second spring pair in said direction;

means for applying to said third leaf spring pair a linear force in a direction perpendicular to said second coordinate axis to displace said third spring pair in said direction; and means for applying the displacement of the third leaf spring pair, resulting from the application of at least two of said linear forces to the workpiece, to effect a corresponding displacement of the workpiece.

17. The apparatus of claim 16 wherein said third leaf spring pair is substantially perpendicular to the aligned first and second spring pairs.

18. The apparatus of claim 17 wherein the three linear forces are each substantially perpendicular to the positions of the spring pair to which the respective force is being applied prior to the displacement of said spring pairs.

19. The apparatus of claim 16 wherein said leaf spring members are each preloaded against its respective linear force applying means.

20. The apparatus of claim 16 wherein said means for applying the linear forces comprise a rotating inclined cam and a follower for said cam mounted on the spring pair to which the respective linear force is being applied.

21. The apparatus of claim 16 wherein said means for applying the linear forces are fluidic driving means.

References Cited

UNITED STATES PATENTS

| | | | |
|---|---|---|---|
| 3,242,796 | 3/1966 | Strickler | 350—271 X |
| 3,400,597 | 9/1968 | Nater | 74—89.15 |

MILTON KAUFMAN, Primary Examiner

U.S. Cl. X.R.

74—89, 96, 479; 350—272